(12) United States Patent
Minoda (10) Patent No.: US 8,017,017 B2
(45) Date of Patent: Sep. 13, 2011

(54) METHOD FOR PRODUCING A TARGET SUBSTANCE USING A SIMULATED MOVING BED CHROMATOGRAPHY SEPARATION SYSTEM

(75) Inventor: Toshiharu Minoda, Myoko (JP)

(73) Assignee: Daicel Chemical Industries, Ltd., Osaka-shi, Osaka (JP)

( * ) Notice: Subject to any disclaimer, the term of this patent is extended or adjusted under 35 U.S.C. 154(b) by 0 days.

(21) Appl. No.: 12/737,542

(22) PCT Filed: Aug. 26, 2009

(86) PCT No.: PCT/JP2009/064820
§ 371 (c)(1),
(2), (4) Date: Jan. 21, 2011

(87) PCT Pub. No.: WO2010/024266
PCT Pub. Date: Mar. 4, 2010

(65) Prior Publication Data
US 2011/0120952 A1    May 26, 2011

(30) Foreign Application Priority Data
Aug. 26, 2008    (JP) .................................. 2008-216482

(51) Int. Cl.
*B01D 15/08*    (2006.01)
(52) U.S. Cl. ...................... 210/656; 210/659; 210/198.2
(58) Field of Classification Search .................. 210/635, 210/656, 659, 662, 198.2; 127/46.1, 46.2
See application file for complete search history.

(56) References Cited

U.S. PATENT DOCUMENTS

| | | | | |
|---|---|---|---|---|
| 6,379,554 | B1 * | 4/2002 | Kearney et al. | 210/659 |
| 6,544,413 | B1 | 4/2003 | Nagamatsu et al. | |
| 6,602,420 | B2 * | 8/2003 | Kearney et al. | 210/659 |
| 6,740,243 | B2 * | 5/2004 | Wankat | 210/656 |

(Continued)

FOREIGN PATENT DOCUMENTS

JP    51-018392    6/1976

(Continued)

OTHER PUBLICATIONS

"Design of a Simulated Moving Bed: Optimal Particle Size of the Stationary Phase", by Olivier Ludemann-Hombourger et al, Separation Science and Technology, vol. 35(9), 2000, pp. 1285-1305.

*Primary Examiner* — Ernest G Therkorn
(74) *Attorney, Agent, or Firm* — Flynn, Thiel, Boutell & Tanis, P.C.

(57) ABSTRACT

Disclosed is a method for producing a target substance by separating it from a mixture using a simulated moving bed chromatography (SMBC) separation system, which can minimize decreases in separation performance due to interference from a liquid accumulation portion. A material, in which the target substance in the material can be separated using a first SMBC separation system that meets a first condition, is processed to separate and produce the target substance from the material using a second SMBC separation system that meets a second condition, wherein the particle size of a separating agent and fill length of a column tube are both greater, the pressure loss by the column is substantially the same, and the volume ratio of liquid accumulation portions in the endless flow passage of the SMBC separation system is lower.

10 Claims, 3 Drawing Sheets

U.S. PATENT DOCUMENTS

| | | | |
|---|---|---|---|
| 2002/0027104 A1* | 3/2002 | Kearney et al. | 210/659 |
| 2004/0251204 A1 | 12/2004 | Paananen et al. | |
| 2005/0049282 A1 | 3/2005 | Andersson et al. | |
| 2006/0016756 A1 | 1/2006 | Ikeda et al. | |
| 2009/0151432 A1 | 6/2009 | Minoda et al. | |

FOREIGN PATENT DOCUMENTS

| | | |
|---|---|---|
| JP | 63-020006 | 1/1988 |
| JP | 63-020007 | 1/1988 |
| JP | 10-128005 | 5/1998 |
| JP | 2002-082106 | 3/2002 |

* cited by examiner

METHOD FOR PRODUCING A TARGET SUBSTANCE USING A SIMULATED MOVING BED CHROMATOGRAPHY SEPARATION SYSTEM

REFERENCE TO RELATED APPLICATIONS

This application is a 371 of PCT/2009/064820 filed Aug. 26, 2009.

TECHNICAL FIELD

The present invention relates to a method for producing a target substance using a simulated moving bed chromatography separation system (hereinafter, also referred to as "SMBC separation system").

BACKGROUND ART

As a method for separating and obtaining an optinal component in a mixture, a simulated moving bed method (hereinafter, also referred to as "SMB method") involving continuously supplying an eluant and a material solution to an endless flow passage including a plurality of columns connected in series to each other and continuously discharging the eluant from the endless flow passage using an SMBC separation system is known. The optical resolution by the SMB method is drawing attention particularly in the medical and pharmaceutical fields. In the case of producing a product that is required to have quality of very high purity such as pharmaceutical products by the SMB method, the productivity may be degraded remarkably due to the slight interference causing a decrease in purity of a component to be separated.

For example, according to the optical resolution by liquid chromatography using columns filled with a filler having a small particle size, a component separated in the columns is generally present in a thick solution state represented by a narrow peak at the time of detection, when a material solution is supplied intermittently. When the eluant containing a component separated in this state passes through a portion (also referred to as "liquid accumulation portion") where the residence of a solution is liable to occur due to the enlargement, division, and bend each of which is formed in a flow passage having no separating function of a piping, a valve, a pump, etc. in the flow passage, the separated component diffuses in accordance with the shape and size of the liquid accumulation portion. Therefore, the inclusion of a liquid accumulation portion in a flow passage through which a separated component flows is liable to degrade the separation performance. Thus, according to the SMB method, it is desired that an endless flow passage in which the separation of a component is performed repeatedly do not include a liquid accumulation portion or a liquid accumulation portion be decreased in size as much as possible.

Further, regarding the SMB method, generally, it is generally considered to be desired to minimize the use amount of a filler while satisfying the separation performance of the filler as much as possible by using a filler having a particle size of about 20 to 25 μm (see, for example, Non Patent Literature 1). Further, as means for further enhancing the productivity of the production by separation of a component according to the SMB method, the following attempt has been made: for example, by reducing the number of columns to be set in an endless flow passage or by shortening the fill length of a filler to fill the columns (see, for example, Patent Literature 5), the pressure loss occurring in the columns per unit flow rate of an eluant is decreased while the flow rate of the eluant is increased, and the amount of the eluant passing through the columns per unit time is increased while the pressure loss applied to the entire columns is suppressed, and thus, the productivity per SMBC separation system is enhanced.

However, according to such means, the capacity of a liquid accumulation portion becomes larger relative to the capacity of a filler, i.e., the capacity of a flow passage having a separating function per SMBC separation system. Therefore, the influence by the diffusion of a component separated in an eluant in the liquid accumulation portion increases further, which may degrade the separation performance, resulting in the decrease in productivity.

As means for minimizing the diffusion of a component by the liquid accumulation portion as much as possible, for example, it is known to provide a valve designed so as to reduce a liquid accumulation portion in a flow passage of an eluant (see, for example, Patent Literature 1). This valve can withstand conditions of a high flow rate of an eluant and a high pressure in an SMBC separation system, however, the use of such special equipment increases a cost incurred in the SMBC separation system, which may influence the production cost of a separated component.

On the other hand, according to the SMB method, usually, the supply position of an eluant and a material solution, and the discharge position of the eluant move so as to make a circuit of an endless flow passage. It is known that, according to the SMB method, in order to perform appropriate separation, the flow rate of a pump provided in an endless flow passage and circulating an eluant in the endless flow passage is controlled step by step in accordance with the supply and discharge positions. An example of the SMB method including such a control includes a method for controlling the flow rate of the pump within 1 to 2% of a set value of the flow rate in each step (see, for example, Patent Literature 2).

According to the stepwise control of a flow rate, when the control value of the flow rate of a pump is switched, an actual flow rate of an eluant may exceed largely the control value, and thereafter, hunting may occur by the time when the flow rate approaches the set value. Thus, the separation state may be degraded due to the state in which the flow rate of an eluant in an endless flow passage is out of control (see, for example, FIG. 3 of Patent Literature 3). Examples of a method for preventing such an obstacle to the control include mechanical means for providing a pressure adjustment valve on a discharge side of a pump, a method for changing the rotation number of a pump, a method for controlling the flow rate of a pump based on the difference between a set value and an actually measured value at each of a flow rate of an eluant in an endless flow passage and a pressure on a suction side of the pump (see, for example, Patent Literature 4), and a method for controlling the flow rate of a pump by correcting a control signal based on the set value of a pump and the set value of a pressure on a suction side of the pump, based on the control signal in a state in which an eluant flow stably (see, for example, Patent Literature 3).

However, according to these methods, when the flow rate of an eluant is increased so as to enhance the productivity per SMBC separation system as described above, a switching interval of the control of a pump becomes much shorter, which may make it difficult to control the flow rate of an eluant so that appropriate separation is performed. Such tendency is conspicuous particularly in the SMB method using columns each having a fill length shorter relative to the diameter of the columns as described in Patent Literature 1. As the countermeasures against such tendency, the use of columns having a large ratio of a length to a diameter is considered so as to increase the switching interval of the control of the pump. However, in this case, the pressure loss by the columns increases, and hence, the circulation flow rate of an eluant cannot be increased sufficiently.

Prior Art Literatures

Patent Literature

[PTL 1] WO 01/33210 A1
[PTL 2] JP 51-18392 B
[PTL 3] JP 07-8322 B
[PTL 4] JP 07-8321 B
[PTL 5] JP 2002-82106 A

Non Patent Literature

[NPL 1] Olivier Ludemann-Hombourger et al., "Separation Science and Technology", 35(9), 2000, p. 1303

SUMMARY OF INVENTION

Technical Problem

The present invention provides a method capable of suppressing the decrease in separation performance by a liquid accumulation portion in a method for producing a target substance by separating the target substance from a mixture, using an SMBC separation system.

In addition, the present invention further provides a method for further enhancing a separation effect by a stepwise control of a circulation flow rate of an eluant in a method for producing a target substance by separating the target substance from a mixture, using an SMBC separation system.

Solution to Problem

The present invention provides a method for achieving a desired number of theoretical plates in an SMBC separation system and relatively decreasing a capacity of a liquid accumulation portion in the SMBC separation system by using relatively long columns filled with a filler having a relatively large particle size in the SMBC separation system in place of the conventionally used columns, and separating a target substance from a mixture to produce the target substance using the SMBC separation system.

That is, the present invention provides a method for producing a target substance by separating the target substance from a material, using a simulated moving bed chromatography separation system comprising an endless flow passage, the endless flow passage comprising: a plurality of columns filled with a particulate separating agent for separating a target substance; a plurality of connecting flow passages connecting the plurality of columns in series in the endless shape; and a pump supplying an eluant to the columns, in which the material, from which the target substance in the material is separable by using a first simulated moving bed chromatography separation system satisfying a first condition, is used in a second simulated moving bed chromatography separation system satisfying a second condition, thereby the target substance is produced by separating the target substance from the material, in which the first condition is that a particle size of the separating agent is $r1$ (μm), provided that $r1 \leq 25$, columns in which a total fill length of column tubes is $L1$ are used, and a total number of theoretical plates of the columns in the first simulated moving bed chromatography separation system is $N1$, the second condition is that a particle size of the separating agent is $r2$ (μm), provided that $r2 > 25$, columns in which a total fill length of column tubes is $L2$, provided that $L1 < L2$, are used, and a total number of theoretical plates of the columns is $N2$, provided that $0.5N1 \leq N2 \leq 1.5N1$, and when: $Vd1$ represents a capacity of a liquid accumulation portion formed in an endless flow passage of the first simulated moving bed chromatography separation system; $Vc1$ represents a total inner capacity of columns in the first simulated moving bed chromatography separation system; $Vd2$ represents a capacity of a liquid accumulation portion formed in an endless flow passage of the second simulated moving bed chromatography separation system; and $Vc2$ represents a total inner capacity of columns in the second simulated moving bed chromatography separation system, a ratio of $Vd2$ with respect to a sum of $Vc2$ and $Vd2$ is 0.07 or less and is smaller than a ratio of $Vd1$ with respect to a sum of $Vc1$ and $Vd1$.

Further, the present invention provides the method in which, when m represents a number of the columns under the first condition, $L1/m$ is 10 cm or less.

Further, the present invention provides the method in which $L2$ is 1.5 $L1$ or more.

Further, the present invention provides the method in which $r1$ is 10 μm or more.

Further, the present invention provides the method in which $r2$ is larger than 25 μm and equal to 100 μm or less.

Further, the present invention provides the method in which $Vd1$ is equal to $Vd2$.

Further, the present invention provides the method in which the separating agent comprises a polysaccharide derivative.

Further, the present invention provides the method in which the polysaccharide derivative is a cellulose derivative or an amylose derivative.

Further, the present invention provides the method in which the target substance is an optical isomer.

Further, the present invention provides the method in which the simulated moving bed chromatography separation system further comprises: a first flow passage connected to an optinal connecting flow passage, for supplying an eluant to the endless flow passage; a second flow passage connected to an optinal connecting flow passage, for supplying a material solution to the endless flow passage; and third and fourth flow passages each connected to optinal connecting flow passages, for discharging the eluant from the endless flow passage, the pump controls a flow rate with respect to two flow passages connected to positions sandwiching the pump in an endless flow passage among the first to fourth flow passages.

Effects of Invention

According to the present invention, with the use of a separating agent having a large particle size and column tubes each having a large fill length, which enables the number of theoretical plates equivalent to those under the conventional separation conditions to be obtained, the pressure loss by the columns becomes equivalent to that under the conventional separation conditions, and thus, a pump that has been used under the conventional separation conditions can be used as it is. Thus, according to the present invention, the capacity of a liquid accumulation portion with respect to the entire SMBC separation system can be decreased relatively merely by replacing the columns. Therefore, the decrease in separation performance by a liquid accumulation portion can be suppressed in a method for producing a target substance by separating the target substance from a mixture using the SMBC separation system.

The present invention is much further effective in the field in which the use amount of a separating agent is suppressing as in the separation of an optical isomer, and the enhancement of productivity has been considered by the improvement of equipment forming an endless flow passage and an operation method of an SMBC separation system, and is also much further effective in the production of a product that is required to have high quality such as an optical isomer.

Further, according to the present invention, with the use of a separating agent having a large particle size and column tubes each having a large fill length, which enables the number of theoretical plates equivalent to those under the conventional separation conditions to be obtained, the distribution width of a component separated in an endless flow passage becomes larger in accordance with an increase in fill length, compared with the distribution width under the conventional separation conditions. Thus, according to the present invention, the switching interval of the control of a pump becomes larger compared with that under the conventional separation conditions by controlling the flow rate of the pump step by step. Therefore, in a method for producing a target substance by separating the target substance from a mixture using an SMBC separation system, the separation effect by the stepwise control of a circulation flow rate of an eluant can be much further enhanced.

DESCRIPTION OF EMBODIMENTS

The present invention relates to a method for producing a target substance by separating the target substance from a material using an SMBC separation system, in which a material from which the target substance is separable using a first SMBC separation system satisfying a first condition is used in a second SMBC separation system satisfying a second condition to produce the target substance by separating the target substance from the material.

As the SMBC separation systems satisfying the first and second conditions, known SMBC separation systems can be used. An example of such SMBC separation systems includes a system comprising an endless flow passage, a first flow passage connected to an optinal connecting flow passage, for supplying an eluant to the endless flow passage, a second flow passage connected to an optinal connecting flow passage, for supplying a material solution to the endless flow passage, and third and fourth flow passages each connected to optinal connecting flow passages, for discharging the eluant from the endless flow passage, in which the endless flow passage comprises a plurality of columns filled with a particulate separating agent for separating the target substance, a plurality of connecting flow passages connecting the plurality of columns in series in an endless shape, and a pump for supplying the eluant to the columns, as described in JP 2006-84457 A. Another example of the SMBC separation system includes a system in which an endless flow passage is formed of columns connected via cutoff valves, comprising metering pumps for supplying an eluant, supplying a material solution, and discharging the eluant from the endless flow passage, and comprising no pump for circulating the eluant in the endless flow passage, as described in JP 62-91205 A.

The method of the present invention can be performed based on a method usually using such SMBC separation system. Examples of the method using such SMBC separation system include: a general method involving forming four zones in the endless flow passage in accordance with the uneven distribution of a separated component, and performing the supply of an eluant to the endless flow passage, the supply of a material solution, and the discharge of the eluant from the endless flow passage in synchronization; a method involving dividing the endless flow passage into three zones, supplying a material solution from a front end of a first zone, discharging an eluant containing a component that is unlikely to adsorb from a back end of the first zone, supplying the eluant from a front end of a second zone, and discharging the eluant containing a component that is likely to adsorb from a back end of the second zone, in which a cutoff valve between the back end of the first zone and the front end of the second zone is closed, as described in JP 62-91205 A; a method involving the step of circulating an eluant in the endless flow passage, without involving the supply of a fluid to the endless flow passage and the discharge of the fluid from the endless flow passage, as described in JP 63-158105 A; and a method involving performing the supply of an eluant to the endless flow passage, the supply of a material solution, and the discharge of the eluant from the endless flow passage in unsynchronization, as described in SEPARATION SCIENCE AND TECHNOLOGY, 35(12), PP. 1829-1862, 2000.

The material is a liquid composition containing a target substance, and may be a material itself if a substance to be separated in the material including the target substance is a liquid, or a solution of the target substance and a substance to be separated. As a solvent in the case where the material is a solution, at least one solvent selected from water and a known organic solvent can be used.

As the eluant, at least one solvent selected from water and a known organic solvent, which is usually used in the SMB method, can be used.

Examples of the organic solvent include, as described in, for example, JP 2006-84457 A, methanol, ethanol, isopropyl alcohol, acetic acid, tetrahydrofuran, dimethylsulfoxide, dimethylformamide, ethyl acetate, methyl acetate, diethylamine, chloroform, acetonitrile, n-hexane, heptane, tert-butyl methyl ether (MTBE), acetone, toluene, methylene chloride, 1,4-dioxane, and N,N-dimethylacetamide (DMAc).

In addition, examples of the eluant include, as described in, for example, JP 2006-84457 A: binary mixed solvents such as a methanol-ethanol mixed solvent, an isopropyl alcohol-n-hexane mixed solvent, an ethanol-n-hexane mixed solvent, and a methanol-acetonitrile mixed solvent; and ternary mixed solvents such as a methanol-acetonitrile-acetic acid mixed solvent, a methanol-acetonitrile-diethylamine mixed solvent, an isopropyl alcohol-n-hexane-diethylamine mixed solvent, and an ethanol-n-hexane-diethylamine mixed solvent.

The first condition is one under which it is apparent that a target substance can be separated by the SMBC separation system, and the first condition is that a separating agent has a particle size of r1 (μm), provided that $r1 \leq 25$, columns in which the total fill length of each of the column tubes is L1 are used, and the total number of the theoretical plates of the columns in the first SMBC separation system is N1.

The particle size of the separating agent is a value representing the feature depending upon the size of a particle of the entire separating agent used in each column. In r1 and r2, the same kind of values is used. Examples of the particle size of such separating agent include a mass average particle size, a volume average particle size, and a representative value. Although the particle size of the separating agent can be measured by, for example, a laser diffraction and scattering method or a coulter counter method, the particle size may be a catalog value.

The fill length of the column tube represents the length of a cylindrical portion in the column tube, in which a separating agent is to be contained.

The total number of theoretical plates of the columns refers to the total number of theoretical plates of the respective columns used under each of the first and second conditions. The number of theoretical plates of each column can be obtained by, for example, the following Van Deemter equation. However, in the following equation, H represents the height of a theoretical plate, N represents the fill length of a column tube, L represents the number of theoretical plates, dp represents the particle size of a separating agent, u represents a linear velocity, A represents a diffusion (multi-passage diffusion) by flowing, and B represents the diffusion of a solute in a flow passage.

$$H = \frac{L}{N} = A d_p + B d_p^2 u \quad \text{[Math. 1]}$$

Under the first condition, L1 represents the total fill length of a plurality of column tubes. The number of a plurality of column tubes and the fill-length of each column tube are generally the same under the first condition, but may be different from each other. Under the first condition, in terms of enhancing the productivity of a target substance by suppressing the use amount of a separating agent, r1 is preferably 10 μm or more, and N1 is preferably 100 to 4000, more preferably 150 to 3000, still more preferably 200 to 2000. Further, assuming that the number of the columns under the first condition is m, it is preferred that L1/m be 10 cm or less in terms of the foregoing. Although L1/m generally represents the fill length per column in m columns, the present invention also include the case where L1/m is achieved by a plurality of columns.

r1, L1, and N1 under the first condition can be obtained, for example, from the condition under which a target substance is actually separated and produced using the SMBC separation system or the condition under which r1, L1, and N1 are obtained theoretically based on the calculation chemistry such as simulation using a computer. The simulation can be performed using, for example, Aspen Chromatography.

The second condition is as follows: the particle size of a separating agent is r2 (μm), provided that $r2 > 25$, the number of columns is n, the total fill length of column tubes is L2, provided that $L1 < L2$, the total number of theoretical plates of the columns is N2, provided that $0.5N1 \leq N2 \leq 1.5N1$, and when Vd1 represents the capacity of a liquid accumulation portion to be formed in an endless flow passage of a first simulated moving bed chromatography separation system, Vc1 represents the total inner capacity of the columns in the first simulated moving bed chromatography separation system, Vd2 represents the capacity of a liquid accumulation portion to be formed in an endless flow passage of a second simulated moving bed chromatography separation system, and Vc2 represents the total inner capacity of the columns in the second simulated moving bed chromatography separation system, the ratio of Vd2 with respect to the sum of Vc2 and Vd2 is 0.07 or less and is smaller than the ratio of Vd1 with respect to the sum of Vc1 and Vd1 (i.e., $Vd2/(Vc2+Vd2) \leq 0.07$ and $Vd2/(Vc2+Vd2) < Vd1/(Vc1+Vd1)$).

Under the second condition, in terms of suppressing the pressure loss by the columns and allowing the separation performance to be exhibited sufficiently, r2 is preferably more than 25 μm and 100 μm or less, more preferably 30 μm to 70 μm, still more preferably 30 μm to 50 μm.

Under the second condition, L2 represents the total fill length of a plurality of column tubes. The number of a plurality of column tubes and the fill length in each column are generally the same under the second condition, but may be different from each other. In addition, under the second condition, in terms of allowing the separation performance to be exhibited, L2 is preferably 1.5 L1 or more, more preferably 1.9 L1 or more. Further, L2 is preferably 60 cm or more, more preferably 70 cm or more. Although the upper limit of L2 is not particularly limited, the upper limit of L2 is preferably 25 L1 or less based on the upper limit value of r2, preferably 3000 cm or less. Further, assuming that the number of the columns under the second condition is n, L2/n is preferably 15 to 300 cm, more preferably 15 to 250 cm, still more preferably 19 to 200 cm in view of the foregoing. Although L2/n generally represents the fill length per column in n column tubes, the present invention also includes the case where L2/n is achieved by a plurality of columns.

Further, under the second condition, in terms of suppressing the difference from the first condition due to the difference in pressure loss caused by the columns, N2 is preferably 0.6 N1 to 1.4 N1, more preferably 0.8 N1 to 1.2 N1, still more preferably 0.9 N1 to 1.1 N1, and yet still more preferably equal to N1. Further, N2 is preferably 60 to 6000, more preferably 80 to 5000, and still more preferably 90 to 4000.

The liquid accumulation portion to be formed in the endless flow passage of the SMBC separation system refers to a portion where the residence of a liquid is liable to occur due to the shape and size of the flow passage. Examples of such liquid accumulation portion include a cylinder of a pump and a branch tube from a main tube to a valve body in a valve having the main tube, the branch tube branching from the main tube, and the valve body for opening/closing the branch tube.

The capacity of a liquid accumulation portion to be formed in the endless flow passage of the SMBC separation system refers to the total capacity of the liquid accumulation portion (s) in the endless flow passage. In the case where an element forming a liquid accumulation portion in the second SMBC separation system is the same as an element forming a liquid accumulation portion in the first SMBC separation system, for example, a main element forming the liquid accumulation portion, which occupies 50% or more of the liquid accumulation portion, may be used as the capacity of a liquid accumulation portion to be formed in the endless flow passage in the first and second SMBC separation systems. An example of the capacity of the liquid accumulation portion caused by such main element includes the capacity of a cylinder of a pump. The capacity of a liquid accumulation portion to be formed in the endless flow passage of the SMBC separation system can be obtained, for example, by measuring the capacity in which the inside of the endless flow passage is replaced by water or an appropriate solvent in a state in which the columns are removed from the endless flow passage.

Under the second condition, the capacity ratio $Vd2/(Vc2+Vd2)$ of a liquid accumulation portion is preferably 0.05 or less, more preferably 0.04 or less, still more preferably 0.03 or less, yet still more preferably 0.02 or less, in terms of suppressing the decrease in separation performance by the diffusion of a separated component in the liquid accumulation portion.

Further, the capacity ratio $Vd2/(Vc2+Vd2)$ of a liquid accumulation portion under the second condition is preferably 0.9 times or less, more preferably 0.7 times or less the capacity ratio $Vd1/(Vc1+Vd1)$ of a liquid accumulation portion under the first condition, in view of suppressing the decrease in separation performance by the diffusion of a separated component in the liquid accumulation portion. The endless flow passage of the second SMBC separation system may have the same configuration as that of the endless flow passage of the first SMBC separation system excluding the columns to be used, within a range satisfying the condition of the relationship of the capacity ratio, or may be configured using different equipment (valve and pump, etc.). In the present invention, in view of realizing a simple configuration of the second SMBC separation system and a simple separation operation by this system, it is preferred that the endless flow passage in the second SMBC separation system have the same configuration as that of the endless flow passage in the first SMBC separation system excluding the columns, that is, it is preferred to use the same pump. It is also preferred that $Vd1$ be equal to $Vd2$.

The number m of the columns under the first condition and the number n of the columns under the second condition are each 2 or more, preferably 3 to 12, more preferably 4 to 10, still more preferably 5 to 8. m and n may be different from each other or identical with each other.

Further, under the second condition, the column tubes having an inner diameter different from that of the columns under the first condition may be used within a range satisfying each of the conditions.

The method of the present invention can be used in various technical fields in which the separation of a target substance by the SMBC separation system can be used. The method of the present invention has a satisfactory separation property of a target substance compared with the separation under the first condition, and can realize high productivity. Therefore, the method of the present invention can be used preferably for the production of high-quality products. Examples of such production of high-quality product include the production of medicine or an optical isomer of an intermediate thereof using a separating agent comprising a polysaccharide derivative.

It is preferred that the separating agent comprises a polysaccharide derivative in terms of producing an optical isomer. As such separating agent, a known separating agent described in, for example, WO 95/23125 A1 used in optical resolution using the SMBC separation system, and an example includes a separating agent formed of a particulate carrier and a polysaccharide derivative carried on the carrier.

Examples of the carrier include: a porous organic carrier formed of polystyrene, polyacrylamide, polyacrylate, or the like; and a porous inorganic carrier such as silica, alumina, magnesia, glass, kaolin, titanium oxide, silicate, or hydroxyapatite. In addition, examples of polysaccharide in the polysaccharide derivative include $\beta$-1,4-glucan (cellulose), $\alpha$-1,4-glucan (amylose, amylopectin), $\alpha$-1,6-glucan (dextran), $\beta$-1,6-glucan (pustulan), $\beta$-1,3-glucan (such as curdlan or schizophyllan), $\alpha$-1,3-glucan, $\beta$-1,2-glucan (Crown Gall polysaccharide), $\beta$-1,4-galactan, $\beta$-1,4-mannan, $\alpha$-1,6-mannan, $\beta$-1,2-fructan (inulin), $\beta$-2, 6-fructan (levan), $\beta$-1,4-xylan, $\beta$-1,3-xylan, $\beta$-1,4-chitosan, $\alpha$-1,4-N-acetylchitosan (chitin), pullulan, agarose, alginic acid, and a starch containing amylose. In addition, as such polysaccharide derivative, there are given a cellulose derivative and an amylose derivative. To be more specific, there are given an ester derivative of cellulose, a carbamate derivative of cellulose, an ester derivative of amylose, and a carbamate derivative of amylose.

According to the method of the present invention, it is preferred to control the flow rate of a pump in accordance with the connecting positions of the first to fourth flow passages in the endless flow passage, in terms of enhancing the productivity of a target substance. Such control of the flow rate of a pump can be performed using various control methods that are known to be performed in the SMBC separation system, and for example, the control of the flow rate can be performed in accordance with two flow passages connected to positions sandwiching a pump in the endless flow passage among the first to fourth flow passages.

The method of the present invention is described further in detail.

Figure 1:
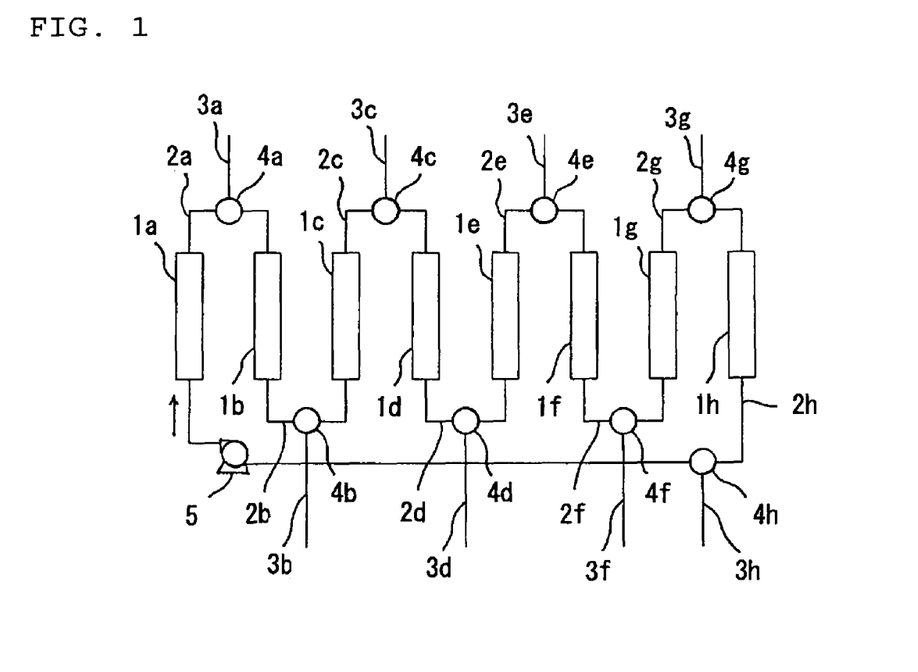
FIG. 1 is a diagram schematically illustrating a configuration of an example of an SMBC separation system satisfying a first condition in the present invention.

First, it is assumed that it is known that a particular optical isomer can be separated from a racemic body using the SMBC separation system illustrated in FIG. 1. The SMBC separation system comprises 8 columns $1a$ to $1h$, connecting flow passages $2a$ to $2h$ forming an endless flow passage by connecting the respective columns, supply and discharge flow passages $3a$ to $3h$ connected to the respective connecting flow passages 2, valves $4a$ to $4h$ allowing the respective connecting flow passages 2 and the respective supply and discharge flow passages 3 to communicate with or to be disconnected from each other, and a pump 5 provided in the connecting flow passage $2h$ and circulating a liquid in the endless flow passage. The SMBC separation system of FIG. 1 corresponds to the first SMBC separation system in the present invention, and the columns 1, the connecting flow passages 2, and the pump 5 form the endless flow passage.

The columns 1 are filled with a particulate separating agent formed of a silica gel as a carrier and a carbamate derivative of cellulose carried on the silica gel. The respective supply and discharge flow passages 3 represent four flow passages: a first flow passage for supplying an eluant, a second flow passage for supplying a material solution, and third and fourth flow passages for discharging a liquid from the endless flow passage. The valves 4 allow the four flow passages to communicate with the connecting flow passages 2 or disconnect them each independently, and for example, rotary valves provided in the connecting flow passages 2, block valves, or two-way valves provided respectively in the four flow passages.

In the SMBC separation system of FIG. 1, first, an eluant is supplied to the endless flow passage from the flow passage $3a$, a material solution is supplied to the endless flow passage from the flow passage $3e$, the eluant in the endless flow passage is discharged from the flow passages $3c$ and $3g$, and the other supply and discharge flow passages 3 are disconnected from the endless flow passage. At this time, an eluant mainly containing an extract as a component likely to be adsorbed by the separating agent is discharged from the flow passage $3c$, and an eluant mainly containing raffinate as a component unlikely to be adsorbed by the separating agent is discharged from the flow passage 3g. Then, while keeping the relative relationship, these supply and discharge positions move to the connecting flow passages 2 on a downstream side in a flow direction of the eluant in the endless flow passage after a predetermined period of time. That is, when a predetermined period of time elapses, the flow passages 3a, 3c, 3e, and 3g are disconnected respectively, the eluant is supplied to the endless flow passage from the flow passage 3b, a material solution is supplied to the endless flow passage from the flow passage 3f, and the eluant in the endless flow passage is discharged from the flow passages 3d and 3h.

Figure 2:
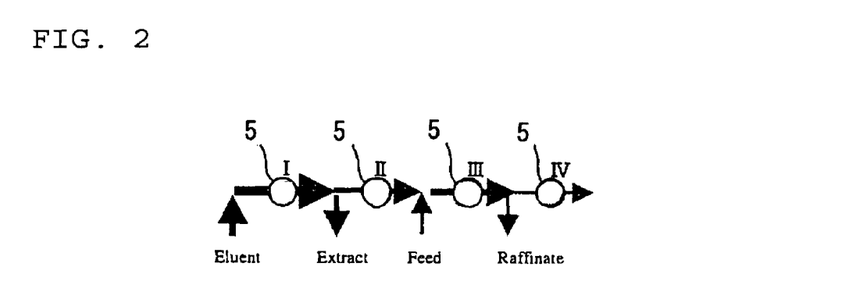
FIG. 2 is a diagram illustrating an example of positions of pumps 5 and a control amount of a flow rate in an endless flow rate of the SMBC separation system of FIG. 1.
Figure 3:
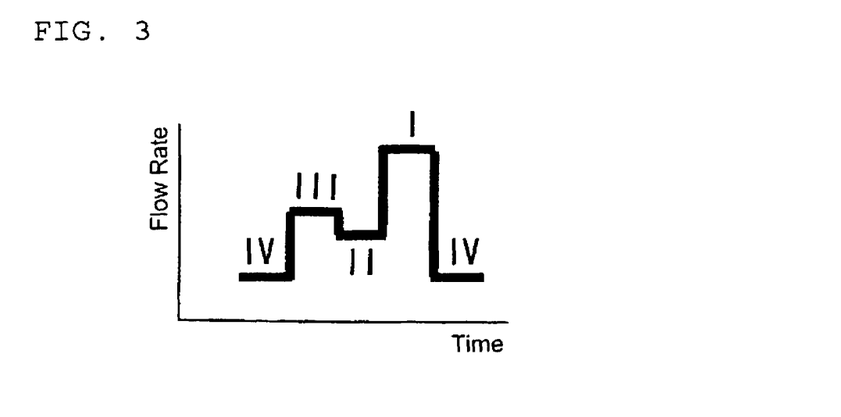
FIG. 3 is a diagram illustrating an example of a flow rate in control of the flow rate of the pumps 5 of FIG. 2 and a set value of a time.

Further, the pump 5 controls the flow rate in accordance with the supply and discharge positions. That is, as illustrated in FIG. 2, the pump 5 is operated at a flow rate I when the pump 5 is positioned between the flow passage 3 that supplies the eluant and the flow passage 3 that discharges the extract, operated at a flow rate II when the pump 5 is positioned between the flow passage 3 that discharges the extract and the flow passage 3 that supplies the material solution, is operated at a flow rate III when the pump 5 is positioned between the flow passage 3 that supplies the material solution and the flow passage 3 that discharges raffinate, and is operated at a flow rate IV when the pump 5 is positioned between the flow passage 3 that discharges raffinate and the flow passage 3 that supplies the eluant, respectively. The flow rate by the pump 5 increases in the order of the flow rate I, flow rate III, flow rate II, and flow rate IV. The control of the flow rate of the pump 5 in the SMBC separation system of FIG. 1 is illustrated, for example, as in FIG. 3. By thus switching the flow passages 3 periodically, a stationary concentration distribution of the extract and a stationary concentration distribution of raffinate are respectively formed in the endless flow passage, and the extract and raffinate are each discharged from the endless flow passage at a constant concentration.

In the SMBC separation system illustrated in FIG. 1, for example, the fill length (L1/m, m=8) of the column tube of each of the columns 1 is 10 cm, the particle size of the separating agent is 20 µm, the total number of theoretical plates of the columns 1 is 1600, the total inner capacity Vc1 of the columns 1 is 251.2 mL, the capacity of the cylinder of the pump 5 is 25 mL, and the total capacity Vd1 of the liquid accumulation portion is 40 mL. Thus, assuming that the capacity of the cylinder of the pump 5 is Vd1 in the SMBC separation system illustrated in FIG. 1, Vd1/(Vc1+Vd1) is 0.091.

Figure 4:
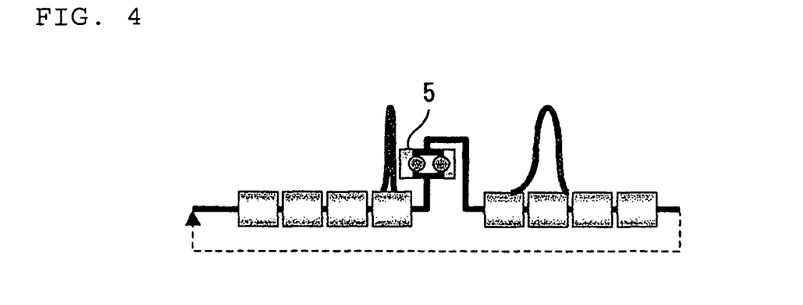
FIG. 4 is a diagram illustrating the influence of the pumps 5 on a separated component in the SMBC separation system of FIG. 1.

When the concentration of a target substance in the endless flow passage of the SMBC separation system of FIG. 1 is expressed in terms of a peak, the concentration is expressed as an acute peak before the passage of the pump 5, as illustrated in FIG. 4. That is, the target substance is concentrated to a small part of the eluant in the endless flow passage by the columns 1. However, when the eluant containing a high concentration of the target substance passes through the pump 5 having a relatively large liquid accumulation portion in the endless flow passage, the target substance diffuses into a larger amount of the eluant, resulting in that the width of the peak is enlarged. The enlargement of the width of the peak represents the decrease in the number of plates for separation.

Here, columns 7 having the same number of theoretical plates as that of the columns 1 are prepared, using a separating agent having a particle size of 30 µm. The columns 7 are configured in the same way as the columns 1, except that the particle size of the separating agent is 30 µm and the fill length (L2/n, n=8) of each of the column tubes is 18.5 cm. Regarding the pressure loss of the columns, the columns having the same number of theoretical plates have the same pressure loss, as is apparent from the following Kozeny-Carman equation.

$$\frac{\Delta p}{L} = h_k \cdot \frac{36}{dp}\left(\frac{1-\varepsilon}{\varepsilon}\right)^2 \mu u = \frac{\phi}{d_p^2}u = \phi u \qquad [\text{Math. 2}]$$

In the equation, $\Delta p$ represents a pressure loss, L represents the fill length of the column tube, hk represents the Kozenzy coefficient, dp represents the particle size of a separating agent, $\varepsilon$ represents a porosity, $\mu$ represents the viscosity of a liquid, and u represents a linear velocity.

Figure 5:
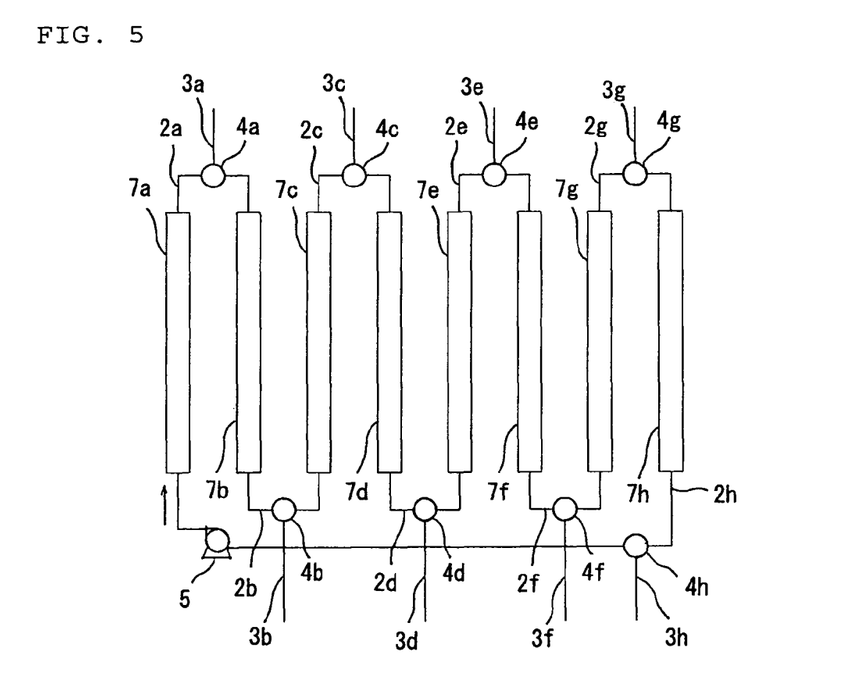
FIG. 5 is a diagram schematically illustrating a configuration of an example of an SMBC separation system satisfying a second condition in the present invention.

As the pressure loss by the columns 1 is the same as that by the columns 7, the SMBC separation system using the columns 7 can be configured in the same way as the SMBC separation system of FIG. 1, except for using the columns 7 in place of the columns 1, as illustrated in FIG. 5. The SMBC separation system of FIG. 5 corresponds to the second SMBC separation system in the present invention. In the SMBC separation system of FIG. 5, the total capacity Vc2 of the columns 7 is 465.0 mL, and the total capacity Vd2 of the cylinder of the pump 5 and the liquid accumulation portion is the same as that of the SMBC separation system of FIG. 1. Thus, in the SMBC separation system of FIG. 5, assuming that the capacity of the cylinder of the pump 5 is Vd2, Vd2/(Vc2+Vd2) is 0.051.

Figure 6:
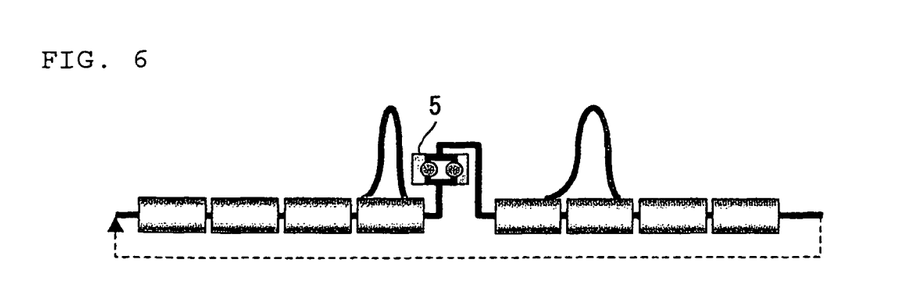
FIG. 6 is a diagram illustrating the influence of the pumps 5 on a separated component in the SMBC separation system of FIG. 2.

When the concentration of a target substance in an endless flow passage of the SMBC separation system of FIG. 5 is expressed in terms of a peak in the case where the optical resolution is performed under the same conditions as those of the SMBC separation system of FIG. 1, as illustrated in FIG. 6, the concentration is expressed as a peak in a shape relatively larger in width compared with that of the peak before the pump of FIG. 4 before the passage of the pump 5 because the length of the filling layer of the SMBC separation system of FIG. 5 is larger than that of the SMBC separation system of FIG. 1. That is, in the SMBC separation system of FIG. 5, even when the target substance is concentrated to the eluant in the same manner as in the SMBC separation system of FIG. 1, the width of the concentration portion in the endless flow passage is larger than that in the SMBC separation system of FIG. 1.

After the passage of the pump 5, although the width of the peak is enlarged due to the diffusion of the target substance in the liquid accumulation portion of the pump 5, the peak in the SMBC separation system of FIG. 5 is originally wider than the peak in the SMBC separation system of FIG. 1, and hence the peak in the SMBC separation system of FIG. 5 is relatively unlikely to be influenced by the disturbance and diffusion of a liquid even after the passage of the liquid accumulation portion. Therefore, in the SMBC separation system of FIG. 5, a change in shape of the peak is smaller than that of the peak of FIG. 4, compared with the SMBC separation system of FIG. 1. That is, the optical resolution using the SMBC separation system of FIG. 5 is unlikely to be influenced by the liquid accumulation portion (by the pump 5) in the SMBC separation system, compared with the optical resolution using the SMBC separation system of FIG. 1. Thus, in the SMBC separation system of FIG. 5, when the concentration portion passes through the pump 5, the satisfactory separated state of the target substance by the separating agent is kept, compared with the SMBC separation system of FIG. 1.

Figure 7:
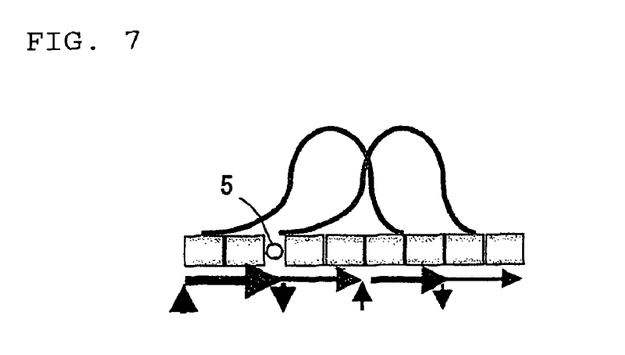
FIG. 7 is a diagram illustrating a concentration distribution of each component in an endless flow passage in a stationary state of optical resolution in the SMBC separation system of FIG. 1.
Figure 8:
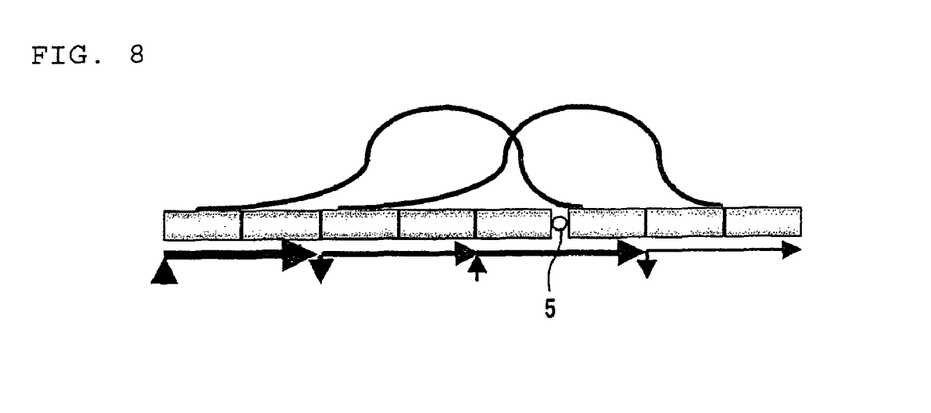
FIG. 8 is a diagram illustrating a concentration distribution of each component in an endless flow passage in a stationary state of optical resolution in the SMBC separation system of FIG. 2.

By the way, in a stationary state in the optical resolution in the SMBC separation system of FIG. 1, when it is assumed that the extract and raffinate are each distributed across four columns, the distribution is illustrated, for example, as in FIG. 7. In the case where the SMBC separation system of FIG. 1 and the SMBC separation system of FIG. 5 are operated under the same condition, the numbers of theoretical plates of the columns used therein are the same and the pressure losses by the columns are the same. Therefore, the length of the filling layer increases depending upon the ratio of the particle size of the separating agent in the SMBC separation system of FIG. 5, compared with that of the SMBC separation system of FIG. 1. Therefore, in the SMBC separation system of FIG. 5, the width of the peak (length of the concentration portion) also increases substantially depending upon the ratio of the length of the columns. Thus, the extract and raffinate in the stationary state of the optical resolution in the SMBC separation system of FIG. 5 are each distributed across four columns in the same way as in the SMBC separation system of FIG. 1, for example, as illustrated in FIG. 8.

As the switching interval (i.e., the control time at one flow rate of the pump 5) of the flow passages 3 is set in accordance with the supply and discharge positions and the position of the pump 5 in the endless flow passage, the switching interval of the flow passages 3 in the SMBC separation system of FIG. 5 becomes longer in accordance with an increase in fill length of the columns, compared with the switching interval of the flow passages 3 in the SMBC separation system of FIG. 1. Therefore, in the optical, resolution in the SMBC separation system of FIG. 5, the time during which the actual flow rate by the pump 5 is substantially the same as the set value is longer than that in the optical resolution in the SMBC separation system of FIG. 1, in one switching interval of the flow passages 3. Thus, in the optical resolution in the SMBC separation system of FIG. 5, the separated state of the extract and raffinate caused by the control of the flow rate by the pump 5 becomes more satisfactory, and an extract or raffinate of higher purity can be obtained, compared with those in the optical resolution in the SMBC separation system of FIG. 1.

Further, as the switching interval of the flow passages 3 in the SMBC separation system of FIG. 5 becomes longer in accordance with an increase in fill length of the columns, the switching interval of the flow passages 3 in the SMBC separation system of FIG. 5 can be further shortened without decreasing the separation effect.

For example, in the SMBC separation system of FIG. 1, the switching interval of the flow passages 3 includes a control preparation time from the beginning of the control of the flow rate of the pump 5 until the flow rate is controlled based on the set value and a flow rate control time during which the effect by the controlled flow rate is obtained. Each of the control preparation time and the flow rate control time of the switching interval of the flow passages 3 in the SMBC separation system of FIG. 5 also becomes long apparently, in accordance with an increase in fill length of the columns.

However, actually, the control preparation time in the SMBC separation system of FIG. 5 is the same as the control preparation time in the SMBC separation system of FIG. 1 because the pump 5 is the same as that in the SMBC separation system of FIG. 1 and the set value of the flow rate is the same as that in the SMBC separation system of FIG. 1 although one control time is longer. Thus, the time difference between the apparent control preparation time and the actual control preparation time in the SMBC separation system of FIG. 5 is a time during which the flow rate control effect is obtained in the SMBC separation system of FIG. 5. This time is not included in the apparent flow rate control time. Therefore, even when this time is shortened, the separation property enhancement effect by the flow rate control in the SMBC separation system of FIG. 5 is not impaired.

Thus, in the SMBC separation system of FIG. 5, when the switching interval of the flow passages 3 prolonged in accordance with an increase in fill length of the columns is shortened by the above-mentioned time difference, the supply amounts of the eluant and the material solution and the discharge amounts of the eluants containing an extract and raffinate per unit time can be increased while the flow rate control effect by the pump 5 is obtained, compared with the SMBC separation system of FIG. 1. Therefore, the productivity can be further enhanced.

Alternatively, in the SMBC separation system of FIG. 5, when the concentration of a material in a material solution is increased while the switching interval of the flow passages 3 remains long in accordance with an increase in fill length of the columns, the discharge amounts of the eluants containing the extract and raffinate per unit time can be increased, compared with the SMBC separation system of FIG. 1. Thus, the productivity can be further enhanced.

Further, in the SMBC separation system of FIG. 1, in the case where the flow rate of the pump 5 is set so as to ensure the switching interval of the flow passages 3 required for obtaining the separation property enhancement, effect by the control of the flow rate by the pump 5, i.e., in the case where the flow rate of the pump 5 can be increased if the switching interval of the flow passages 3 is not considered, the flow rate of the pump 5 can be further increased, and the switching interval of the flow passages 3 can be further shortened in accordance with an increase in flow rate by the pump 5, in the SMBC separation system of FIG. 5. As described above, when the flow rate of the pump 5 is increased, the switching number of the flow passages 3 per unit time increases in the SMBC separation system of FIG. 5, compared with that in the SMBC separation system of FIG. 1. Therefore, the discharge amounts of the eluants containing the extract and raffinate can be increased, and the productivity can be further enhanced.

As is apparent from the above-mentioned description, according to the method of the present invention, columns each having a pressure loss per unit fill length smaller than that of the conventional example and each having a fill length larger than that of the conventional example are adopted in the SMB method, the size of each of the columns is enlarged compared with a liquid accumulation portion derived from equipment (mainly, a pump) provided in an endless flow passage, and the ratio of the capacity of a separating agent with respect to the entire capacity of the endless flow passage is increased relatively and the ratio of the liquid accumulation portion is decreased relatively to reduce the influence of the diffusion of a target substance in the liquid accumulation portion in the SMB method, whereby the separation performance of the SMBC separation system can be enhanced.

The effect of such method of the present invention is particularly remarkable in the optical resolution required to have quality of very high purity as in medical products. Further, according to the method of the present invention, the influence derived from the liquid accumulation portion is small, which makes it unnecessary to use special equipment required to have high processing precision in the SMBC separation system, and the cost of the SMBC separation system can be reduced.

Further, according to the method of the present invention, by using columns each having a pressure loss per unit fill length smaller than that of the conventional example and further enlarging the fill length compared with the conventional example, a time per step becomes longer than that of the conventional example. More specifically, according to the method of the present invention, in one SMBC separation system, a time required for one step is long while the flow rate of a liquid supplied to the endless flow passage and the flow rate of a liquid discharged from the endless flow passage are the same as those of the SMBC separation system in the conventional SMB method. Therefore, a time during which the actual flow rate in the endless flow passage and the set value are matched with each other in one step becomes long, and the separation effect by the flow rate control is expressed more than that in the conventional example, and the separated state of a target substance becomes more satisfactory. Therefore, a product of purity higher than that of the conventional example can be obtained.

Further, in the case where a product of quality higher with respect to required quality is obtained, the supply amount of a material solution per SMBC separation system can be further increased, and the productivity per SMBC separation system can be further enhanced, for example, by further increasing the amount and/or concentration of the material solution supplied to the endless flow rate.

In the above-mentioned embodiment of the present invention, the particle size of a separating agent is set so that the pressure loss in the SMBC separation system of FIG. 1 becomes the same as that in the SMBC separation system of FIG. 5, and the length of each of the columns are set to the same ratio as that of the particle size of the separating agent. However, even when the length of each of the columns is set to a ratio smaller than that of the particle size of the separating agent, satisfactory separation may be obtained. In this case, the pressure loss in the SMBC separation system (for example, the SMBC separation system of FIG. 5) after setting can be decreased, compared with the pressure loss in the SMBC separation system of FIG. 1. Thus, in this case, by increasing the flow rate of the eluant in the endless flow passage so that the pressure loss in the SMBC separation system after setting increases to the pressure loss in the SMBC separation system of FIG. 1, the productivity of a component to be separated can be enhanced. Alternatively, in the above-mentioned case, by operating the SMBC separation system under the condition of obtaining the pressure loss in the SMBC separation system after setting, an SMBC separation system having a lower pressure resistance can be used, and an initial cost and a running cost can be reduced.

According to the present invention, for example, in the case where the productivity of an optical isomer per day in the first SMBC separation system using columns in which column tubes each having an inner diameter of 3 cm and a fill length of 10 cm are filled with a separating agent having a particle size of 20 μm is 0.86 kg-enen/day, in the second SMBC separation system using columns in which column tubes each having the same inner diameter as that in the first system and a fill length of 25 cm are filled with a separating agent having a particle size of 50 μm, the optical isomer can be produced at 2.20 kg-enen/day corresponding to about 2.6 times the above-mentioned productivity.

INDUSTRIAL APPLICABILITY

According to the present invention, in the separation and production of a target substance by the SMB method, the quality and productivity of a product can be further enhanced while using the study results of the conventional optimization as it is, such as the optimization of a separating agent, an equipment to be used, the operations of SMBC separation system, etc. This effect is obtained only by using a larger separating agent and columns with respect to the conventional SMB method. Therefore, the present invention can be realized inexpensively compared with the improvement by the study of the conventional optimization and is expected to bring about great effects to the industrial production of a target substance by the SMB method.

REFERENCE SIGNS LIST 1a to 1h, 7a to 7h column
2a to 2h connecting flow passage
3a to 3h supply or discharge flow passage
4a to 4h valve
5 pump.

The invention claimed is:

1. A method for producing a target substance by separating the target substance from a material, using a simulated moving bed chromatography separation system comprising an endless flow passage, the endless flow passage comprising: a plurality of columns filled with a particulate separating agent for separating the target substance; a plurality of connecting flow passages connecting the plurality of columns in series in the endless shape; and a pump supplying an eluant to the columns, wherein the material, from which the target substance in the material is separable by using a first simulated moving bed chromatography separation system satisfying a first condition, is used in a second simulated moving bed chromatography separation system satisfying a second condition, thereby the target substance is produced by separating the target substance from the material, the first condition is that a particle size of the separating agent is r1 (μm), provided that $r1 \leq 25$, columns in which a total fill length of column tubes is L1 are used, and a total number of theoretical plates of the columns in the first simulated moving bed chromatography separation system is N1, the second condition is that a particle size of the separating agent is r2 (μm), provided that $r2 > 25$, columns in which a total fill length of column tubes is L2, provided that $L1 < L2$, are used, and a total number of theoretical plates of the columns is N2, provided that $0.5N1 \leq N2 \leq 1.5N1$, and when: Vd1 represents a capacity of a liquid accumulation portion formed in an endless flow passage of the first simulated moving bed chromatography separation system; Vc1 represents a total inner capacity of columns in the first simulated moving bed chromatography separation system; Vd2 represents a capacity of a liquid accumulation portion formed in an endless flow passage of the second simulated moving bed chromatography separation system; and Vc2 represents a total inner capacity of columns in the second simulated moving bed chromatography separation system, a ratio of Vd2 with respect to a sum of Vc2 and Vd2 is 0.07 or less and is smaller than a ratio of Vd1 with respect to a sum of Vc1 and Vd1.

2. The method according to claim 1, wherein, when m represents a number of the columns under the first condition, L1/m is 10 cm or less.

3. The method according to claim 1, wherein L2 is 1.5 L1 or more.

4. The method according to claim 1, wherein r1 is 10 μm or more.

5. The method according to claim 1, wherein r2 is larger than 25 μm and equal to 100 μm or less.

6. The method according to claim 1, wherein Vd1 is equal to Vd2.

7. The method according to claim 1, wherein the separating agent comprises a polysaccharide derivative.

8. The method according to claim 7, wherein the polysaccharide derivative is a cellulose derivative or an amylose derivative.

9. The method according to claim 7, wherein the target substance is an optical isomer.

10. The method according to claim 1, wherein the simulated moving bed chromatography separation system further comprises: a first flow passage connected to an optinal connecting flow passage, for supplying an eluant the an endless flow passage; a second flow passage connected to an optinal connecting flow passage, for supplying a material solution to the endless flow passage; and third and fourth flow passages each connected to optinal connecting flow passages, for discharging the eluant from the endless flow passage, the pump controls a flow rate with respect to two flow passages connected to positions sandwiching the pump in the endless flow passage among the first to fourth flow passages.

* * * * *